United States Patent
Cavusoglu Ataman et al.

(10) Patent No.: US 12,465,551 B2
(45) Date of Patent: Nov. 11, 2025

(54) CLOSURE SYSTEM AND KIT

(71) Applicants: HOFFMANN-LA ROCHE INC., Little Falls, NJ (US); GENENTECH, INC., South San Francisco, CA (US)

(72) Inventors: Nariye Salibryam Cavusoglu Ataman, Basel (CH); Monica De Bardi, Basel (CH); Guido Drees, Basel (CH); Maria Enterrios Quintana, Basel (CH); Joseph Alexander Martin, Basel (CH); Holger Roehl, Basel (CH); Thomas Peter Stuedeli, Basel (CH); Eszter Voros, Basel (CH); Neil Bentley Cammish, Basel (CH); Marcel Sigrist, Basel (CH); Shreya Munjal, South San Francisco, CA (US)

(73) Assignees: HOFFMAN-LA ROCHE INC., Little Falls, NJ (US); GENENTECH, INC., South San Francisco, CA (US)

( * ) Notice: Subject to any disclaimer, the term of this patent is extended or adjusted under 35 U.S.C. 154(b) by 119 days.

(21) Appl. No.: 18/257,900

(22) PCT Filed: Dec. 17, 2021

(86) PCT No.: PCT/EP2021/086613
§ 371 (c)(1),
(2) Date: Jun. 16, 2023

(87) PCT Pub. No.: WO2022/129587
PCT Pub. Date: Jun. 23, 2022

(65) Prior Publication Data
US 2024/0050315 A1    Feb. 15, 2024

(30) Foreign Application Priority Data
Dec. 17, 2020   (EP) .................................. 20215180

(51) Int. Cl.
*B65D 45/32*   (2006.01)
*A61J 1/14*    (2023.01)

(52) U.S. Cl.
CPC .......... *A61J 1/1425* (2015.05); *B65D 45/322* (2013.01)

(58) Field of Classification Search
CPC .... B65D 51/002; B65D 51/18; B65D 45/322; B65D 51/241; A61J 1/1425
See application file for complete search history.

(56) References Cited

U.S. PATENT DOCUMENTS

| 4,243,150 A | 1/1981 | Gunne et al. |
| 2011/0000872 A1 | 1/2011 | Aneas |
| 2017/0121163 A1* | 5/2017 | Mutterle ............ B65D 39/0052 |

FOREIGN PATENT DOCUMENTS

| FR | 2908396 A1 * | 5/2008 | ........... B65D 45/322 |
| FR | 2927316 A1 | 8/2009 | |

(Continued)

OTHER PUBLICATIONS

Written Opinion and International Search Report issued Feb. 4, 2022 in Intl. Appl. No. PCT/EP2021/086613.
Office Action issued Sep. 2, 2025 in JP Appl. No. 2023-536400.

*Primary Examiner* — Anthony D Stashick
*Assistant Examiner* — L Kmet
(74) *Attorney, Agent, or Firm* — MEDLER FERRO WOODHOUSE & MILLS PLLC

(57) ABSTRACT

A closure system for closing a container opening is disclosed that includes a stopper member, a cage member and a lock activation formation. The stopper member includes a plug portion to fit into the container opening and a cover portion to abut a boundary surface of the container opening. In the assembled state of the closure system, the plug portion is fitted into the container opening, the cover portion abuts the boundary surface, and the cage member is mounted to the (Continued)

container. The cage member has a locking structure that in a detached position is disengaged from the container, and in a fixed position engages a corresponding structure of the container. The lock activation formation is configured to interact with the cage member such that the cage member changes from the detached position to the fixed position.

19 Claims, 7 Drawing Sheets

(56) References Cited

FOREIGN PATENT DOCUMENTS

| JP | 4526480 B | 7/2006 |
| JP | 2011511741 A1 | 4/2011 |
| JP | 2017524604 A1 | 8/2017 |
| WO | 2012/152796 A1 | 11/2012 |
| WO | 2015/193830 | 12/2015 |

* cited by examiner

CLOSURE SYSTEM AND KIT

TECHNICAL FIELD

The present invention relates to a closure system according to the preamble of independent claim 1 and more particularly to a kit having a container and such a closure system.

Closure systems of the subjected type comprising a stopper member having a plug portion configured to fit into the opening of the container and a cover portion configured to abut a boundary surface adjacent to the opening of the container, and a cage member made of a shape-retentive material, can be used for tightly and securely closing the opening of the container, in particular, with respect to liquids and gases.

BACKGROUND ART

In many chemical or pharmaceutical applications, liquid substances such as drug substances, chemical substances, substances of clinical trials or others are provided in specific containers such as vials, cartridges or the like. These containers typically have a hollow interior and an opening through which the interior is accessible. The opening typically is surrounded by a boundary surface. The substances are filled into the interior of the containers and the openings are subsequently tightly closed.

For closing the containers, it is known to use elastomeric stoppers. Such stoppers may provide for tightly or even hermetically sealing the openings and additionally to allow retrieval of the substances out of the containers by piercing the stoppers with needles and introducing the needles into the substances. Typically, stoppers have a plug portion and a cover portion, wherein the plug portion is dimensioned to tightly fit into the opening and the cover portion is shaped to abut the boundary surface of the opening. More specifically, the stoppers are pressed into the opening such that the cover portions are compressed to a certain extent to generate sufficient tightness. As required in many applications, stoppers and containers of the kind allow for an efficient aseptic filling and closing of the containers. Further, on an industrial scale, containers, such as particularly vials, and stoppers are often dimensioned in predefined sizes. Like this, automated processing with standard equipment can be efficiently allowed.

To achieve a sufficient tightness of the container after filling and closing, the stoppers have to be pressed into and/or onto surfaces of the containers. To hold the stoppers in such compressed state typically caps or cages are used which are arranged on and around the stoppers and openings. For example, it is known to arrange a rigid plastic cap around the head of a vial being closed with a stopper. Thereby, the head and at least part of the neck portion of the vial typically is completely covered by the plastic cap which holds the stopper in the pressed state. Or, it is known to crimp a partially formed metal cap about the head of the container and the cover portion of the stopper to fix and press the stopper to the container (crimp caps).

A problem which may occur in connection with containers closed with today's solutions of stoppers and caps is that, even though provision of a tight closing of vials or other containers can be achieved, usually visibility of the portion of the container around the opening is hindered. However, for example when highly potent drug substances or lyophilisation are involved visibility of the complete container is important.

Further, known capping solutions are typically not suitable for a comparably long term tight closing. Taking into account the tolerances in manufacture of vials, stoppers and plastic caps often a precise pressure application to the stopper in the short and longer term cannot be assured. Still further, particularly when being (semi-)automatically processed or prepared the closing procedure can be comparably complicated or elaborate, particularly, when a comparably high accuracy is required.

Therefore, there is a need for a device or system preventing the above drawbacks and shortcomings. In particular, it is desired to achieve a precise, secure and efficient tight closing of containers which can also be (semi-)automatically provided. Also, a closure system allowing a closure procedure using known or standard equipment may be beneficial.

DISCLOSURE OF THE INVENTION

According to the invention this need is settled by a closure system as it is defined by the features of independent claim 1, and by a kit as it is defined by the features of independent claim 19. Preferred embodiments are subject of the dependent claims.

In one aspect, the invention is a closure system for closing an opening of a container. The container can be a container used in pharmaceutical or chemical research, development or production such as a cartridge. It can particularly be a vial.

The term "vial" as used herein can relate to vials in the literal sense, i.e. a comparably small vessel or bottle, often used to store pharmaceutical products or pharmaceuticals or medications in liquid, powdered or capsuled form. The vial can be made of a sterilisable material such as glass or plastic such as, e.g., polypropylene, a cyclic olefin copolymer or a cyclic olefin polymer.

The closure system comprises a stopper member, a cage member and a lock activation formation. The term "member" in this connection and in the context of the following description can relate to a single piece unit. Such single piece unit can be embodied by fixing plural pieces or parts, e.g. made of different materials, together, to a monolithic element made of a single material, or a monolithic element made of one or more materials that are chemically or physically bonded in the manufacturing process such as molding an opaque polymer over a transparent substrate or vice versa.

The stopper member is made of an elastic material. It has a plug portion configured to fit and particular to tightly fit into the opening of the container and a cover portion configured to abut a boundary surface adjacent to the opening of the container.

The term "elastic" in connection with the stopper member can relate to properties of the material the stopper member is made of. More specifically, such material properties can be elasto-plastic and, in particular, compressible. Advantageously, the material of the stopper member allows it to be sterilized and to maintain aseptic conditions. The stopper member can be embodied as one piece, i.e. as a monolithic element. The plug portion can be essentially cylindrical such that it matches the geometry of the opening. To allow the cover portion to abut the boundary surface, the cover portion typically laterally or radially projects over the plug portion. It can be more or less disc shaped.

The cage member is made of a shape-retentive material and has a locking structure. The term "shape retentive" as used in this context relates to a material or structure being capable of maintaining its form when no force is applied. In particular, the shape retentive material can be dimensionally stable. Typically, shape-retentive materials are comparably rigid. Particularly, the material of the cage member can be more rigid than the material of the stopper member. Also, the shape-retentive material advantageously is sufficiently elastic to allow deformation as described below.

The closure system is configured to be in an assembled state in which the plug portion of the stopper member is fitted into the opening of the container, the cover portion of the stopper member abuts the boundary surface of the container and the cage member is mounted to the container.

The locking structure of the cage member is configured, in the assembled state of the closure system, to be in a detached position in which the locking structure of the cage member is disengaged from the container, and in a fixed position in which the locking structure engages a corresponding structure of the container. When the locking structure engages the corresponding structure, the cage member typically is locked or fixed to the vial. In contrast, when the locking structure disengages the corresponding structure, the cage member typically is not fixed to the vial such that it can be removed from the vial.

The corresponding structure of the container can be a groove or a similar indentation provided at an outer surface of the container. For example, in case the container has a body, a neck and a head with the opening of the container, the groove can be provided at a circumference of the head. Also, the corresponding structure can be an outer shape of the container such as a transition from the head to the neck.

The lock activation formation is configured to interact with the cage member such that the cage member changes from the detached position to the fixed position. Thereby, the lock activation formation can be embodied in various ways in order to be capable of changing the cage member from the detached position to the fixed position. Whereas other structures are possible, particularly advantageous embodiments of the lock activation formation are described in more detail below.

By equipping the cage member with the locking structure, which can be provided in the detached position and the fixed position while the closure system is in the assembled state, it can be achieved that the container can safely and efficiently be closed in a plural step procedure. In particular, for closing the container, initially the stopper member can be arranged into the opening and the cage member can be mounted to the container. Subsequentially, the cage member can be changed from the detached position to the fixed position, wherein the conditions can efficiently and accurately be set when fixing and locking the cage member. For example, a force applied by the cage member can efficiently be predefined when fixing the cage member.

Furthermore, by having the lock activation formation it can be achieved that the closure system is applied in an efficient and automated manner. In particular, the lock activation formation may allow for conveniently activating the locking structure of the cage member.

Preferably, the locking structure of the cage member is deformable from the detached position to the fixed position. The deformation of the locking structure from the detached into the fixed position can be a plastic deformation or, advantageously, an elastic deformation. Deforming the locking structure allows for efficiently embodying the cage member to implement the detached and fixed positions. In particular, the detached position can be provided when the locking structure is essentially non-deformed and the fixed position when the locking structure is deformed.

The cage member preferably is made of a deformable yet at least partly elastic material such as a metal like stainless steel. In particular, the deformable material can be an elastic and shape retentive material.

Preferably, the locking structure of the cage member comprises at least one positive form lock element configured to be deformed to engage the corresponding structure of the container when the locking structure is in the fixed position. Such positive form lock element allows for securing or locking the cage member onto the container.

Preferably, the cage member has a stopper contacting section and an intermediate section between the stopper contacting section and the locking structure. The stopper contacting section, the locking structure and the intermediate section of the cage member advantageously are embodied as one piece, i.e. a monolithic element. Such design allows for efficiently embodying the cage member.

The cage member preferably is configured to apply a force to the cover portion of the stopper member to push the cover portion of the stopper member onto the boundary surface of the opening of the container when the closure system is in the assembled state and the cage member is in the fixed position. Such force may compress the cover portion of the stopper member such that an appropriate tightness can be achieved.

The cage member can have an aperture to access the cover portion of the stopper member when the closure system is in the assembled state.

The force applied by the cage member to the cover portion of the stopper member can be in a range from about 10 Newton (N) to about to about 100 N depending on the material characteristics and geometry of the stopper member. For example, it can be about 15 N. Like this, the stopper member can be compressed between the cage member and the boundary surface of the container to a suitable extent for achieving and maintaining appropriate tightness between the stopper member and the container.

The stopper contacting section can be embodied to planarly or flatly abut at least a section of the cover portion of the stopper member. For example, it can have a shape of a circular disk or a flat ring dimensioned to cover a section of the stopper member being positioned on the boundary surface of the container when the stopper member is fitted into its opening. In particular, when being mounted, the cover section of the stopper member can be positioned axially between the boundary surface and the cage member wherein the stopper contacting section advantageously is designed to abut the complete surface of the cover section of the stopper member being opposite to the surface contacting the boundary surface of the container. Like this, it can be achieved that the stopper member is equally compressed at a comparably large portion when the stopper contacting section is pushed onto the cover portion as described below.

The intermediate section of the cage member can be designed to surround a portion of the container adjacent to the boundary surface adjacent to the opening. In case the container is a vial or a similar container, the intermediate section can be configured to surround a head of the vial which partly comprises the opening and the boundary surface. Thus, the intermediate section of the cage member preferably is configured to surround a head portion of the container.

The intermediate section of the cage member can be cylindrical. Like this, the intermediate section can efficiently be designed to surround the head portion of the container or for other reasons such as asymmetry of interfacing connecting systems such as vial transfer devices. In particular, the intermediate section can have the shape of a small cylinder or ring. The term "small" in connection with the cylinder may relate to a cylinder having a height or axial length which is smaller than a diameter. The cylinder can particularly have a circular cross section.

The at least one positive form lock element of the locking structure of the cage member preferably has a tongue portion extending from the intermediate section of the cage member. The tongue portion can be configured to be radially or centrally moved from the detached position to the fixed position. Such tongue portion allows for providing an efficient and safe locking or fixing of the cage member to the container by engaging the corresponding structure of the container. In particular, a rigidity and elasticity of the locking structure can be suitably configured by means of such a tongue portion.

Advantageously, in order to allow a uniform locking or fixing, the locking structure comprises plural tongue portions. The number of tongue portions can be in a range of about four to twelve, of about four to eight or of about six. Thereby, each of the tongue portions can be elastically movable relative to the intermediate section of the cage member. In particular, the cage member can be configured such that, when being fixed to the container, the intermediate section is essentially not deformed but the tongue portion(s) are elastically moved. The elastic movability of the tongue portion(s), e.g., can be provided by the tongue portion(s) outwardly bending and/or by the tongue portion(s) being tilted about a joint portion. In particular, the tongue portion(s) can be elastically movable by being at least partially deformed in an elastic manner, i.e. tending to move back to the original shape and/or position. The tongue portion(s) may allow for some normal relaxation due to material properties.

Further, each of the tongue portions of the locking structure of the cage member can be elastically movable relative to the intermediate section of the cage member. In particular, the tongue portions may be elastically movable in a radial or outward direction.

Whereas the lock activation formation can be designed in various ways to be configured for achieving the intended effects, in a preferred embodiment, the lock activation formation has a surrounding member configured to, in the assembled state of the closure system, at least partially surround the locking structure of the cage member. The surrounding member can be essentially ring-shaped. Such surrounding member allows for ensuring a safe activation of the locking structure. Further, it can be a comparably simple and secure structure for activation.

Thereby, the surrounding member of the lock activation formation preferably is configured to, in the assembled state of the closure system, contact the locking structure of the cage member such that the locking structure is deformed into the fixed position of the cage member. By such contacting the activation formation can efficiently deform the locking structure.

Preferably, the lock activation formation is configured to, in the assembled state of the closure system, move relative to the cage member from a non-activating position into an activating position. In particular, the lock activation formation can be axially movable onto or relative to the cage member.

The surrounding member of the lock activation formation preferably is configured to, in the assembled state of the closure system, move from the non-activating position, in which the locking structure is essentially non-deformed, to the activating position, in which the surrounding member of the lock activation formation contacts the locking structure of the cage member such that the locking structure is deformed into the fixed position of the cage member.

Thereby, the lock activation formation preferably comprises an activator configured to, in the assembled state of the closure system, move the surrounding member of the lock activation formation from the non-activating position to the activating position. Such activator allows for efficiently initiating activation. In particular, in an automated processing such activator can be beneficial. Also, in case plural containers are closed at once such activator allows for efficient closing or locking.

Preferably, the closure system comprises a cover member reversibly mountable to the cage member. Such cover member allows for protecting the cage member. It can be configured to cover the aperture of the cage member when being mounted to the cage member. The cage member can be provided with the aperture to access the cover portion of the stopper member when the closure system is in the assembled state.

The aperture of the cage member can particularly be located adjacent to a surface of the cover portion of the stopper member being in correspondence with the opening of the container when the stopper member is fitted into the opening and the cage member is mounted to the container. Thereby, the aperture can be aside the section of stopper contacting section abutting the surface of the cover section of the stopper member being opposite to the surface contacting the boundary surface of the container. Like this, the accessible portion of the stopper member can be easily accessed and cleaned, e.g., by alcohol swabbing. For example, the aperture of the stopper contacting section can be a circular central aperture of the stopper contacting section being a flat ring.

The cover member preferably has at least one through hole and the activator of the lock activation formation preferably is shaped to access the surrounding member of the lock activation formation through the at least one through hole of the cover member. For accessing the surrounding member through the cover member, the activator can be equipped with axial blades or posts or a similar structure. Such through holes and shape of the lock activation formation allows for efficiently locking the cage member to the container while being covered by the cover member.

The closure system preferably comprises a support member arranged to resist a movement of the lock activation formation towards the cage member. Particularly, the supper member can be configured to provide a resistance of the movement of the lock activation formation towards the cage member. Thereby, the resistance can be adjusted to withstand a predefined force. The support member can be or comprise a spring element arranged between the lock activation formation, such as the activator thereof, and the cage member or, if present, the cover member such that the activation formation is pushed away from the cage member or cover member, respectively. Such spring member can, e.g., comprise a coil spring, a flexible lamella or tongue, or the like. Alternatively, the support member can be a plastically deformable structure. By means of the support member, it can be assured that the lock activation formation is not unintentionally moved towards the cage member which might cause the locking structure to be inappropriately activated.

Thereby, the support member preferably is configured not to resist the movement of the lock activation formation towards the cage member or the cover member if the lock activation formation is forced towards the cage member or the cover member with a predefined force. The support member can be configured not to resist by collapsing until a predefined force is reached. The predefined force can particularly be adjusted to correspond to an appropriate force to be applied by the cage member to the stopper member in order to compress it to such thickness that the cage can engage the container, e.g., by collapsing around a portion of the container like its head. Like this, the stopper member can be compressed in a predefined manner such that it can be achieved that the stopper member is sufficiently compressed without being impaired. Like this, an advantageous tightness of the closure can be achieved and assured.

Preferably, the cage member has a detent structure configured to hold the cage member on the container when being in the detached position in the assembled state of the closure system. Such holding of the cage member on the container allows for a safe and convenient handling of the container with the closure system in the assembled state but before the cage member is fixed to the container.

Thereby, the detent structure of the cage member may have at least one clipping element configured to snap-fit the container in the assembled state of the closure system. By snap-fitting the cage member to the container, unintentionally removal of the cage member from the container can be prevented. In addition, reuse and counterfeiting can be inhibited. More preferably, the detent structure of the cage member has at least one clamping element configured to clamp the container in the assembled state of the closure system. By clamping the cage member to the container a releasable holding of the cage member on the container can be provided which can, particularly, be sufficiently strong to safely keep the closure system on the container while being processed.

The term "clip" as used herein relates to snapping into or behind the corresponding structure, or a similar mechanism. Generally, such clipping typically involves an elastic deformation or dislocation of one element, such as the cage member, when moving two elements, such as the cage member and the container, together and then elastically deforming the one element back behind a structure of the second element once the two elements are properly positioned. More specifically, for allowing such clipping the clipping element of the cage member can be elastically deformed or bent relative to the other portions of the cage member. The clipping structure allows for providing a snap-fit connection between the cage member and the container. Once clipped or snap-fitted to the container, the cage element is in a form fit connection with the container. Advantageously, when being clipped to the container, the cage element cannot be removed from the container without being destroyed or broken.

The lock activation formation preferably has a clip structure configured to be clipped to the cover member. Such clip structure allows for accurately positioning the lock activation formation relative to the cover member such that a proper closing procedure can be assured.

Another aspect of the invention is a kit comprising a container and a closure system as described above. The container comprises an opening for accessing an interior of the container and a boundary surface adjacent to the opening.

By means of the kit according to the invention the effects and benefits described above in connection with the closure system according to the invention and its preferred embodiments can efficiently be achieved.

BRIEF DESCRIPTION OF THE DRAWINGS

The closure system and kit according to the invention are described in more detail hereinbelow by way of exemplary embodiments and with reference to the attached drawings, in which.

DESCRIPTION OF EMBODIMENTS

In the following description certain terms are used for reasons of convenience and are not intended to limit the invention. The terms "right", "left", "up", "down", "under" and "above" refer to directions in the figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented, and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1:
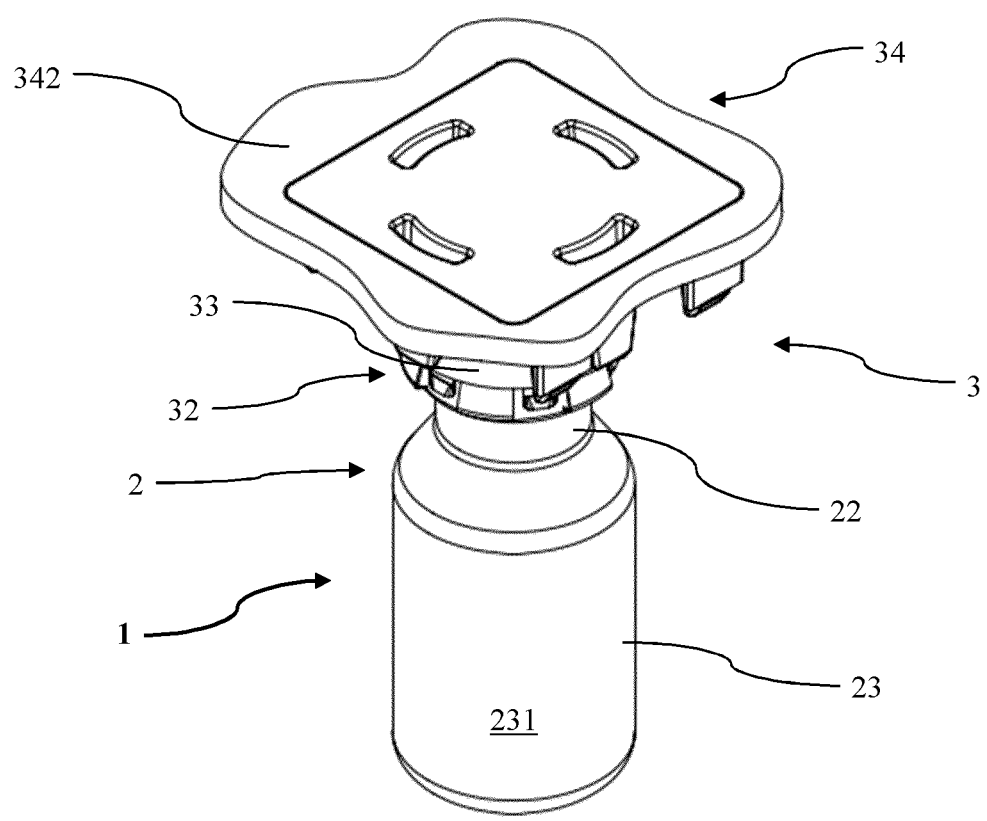
FIG. 1 shows a perspective view of an embodiment of a kit according to the invention comprising an embodiment of a closure system according to the invention from above, wherein the closure system is in an assembled state and its cage member is in a detached position.

FIG. 1 shows a first embodiment of a kit 1 according to the invention comprising a glass or plastic vial 2 as container and a first embodiment of a closure system 3 according to the invention. In FIG. 1 the kit 1 and closure system 3 are depicted in an assembled state where the closure system 3 is mounted to the vial 2.

The vial 2 has a body 23 with a hollow interior 231 and a neck 22 passing over into a head 21 (not visible in FIG. 1) as head portion. The closure system 3 is mounted to the head 21 of the vial 2 such that the head 21 is covered. The closure system 3 comprises a metal cage 32 as cage member, a lid-like cover 33 as cover member and a lock activation formation 34. The lock activation formation 34 has an activator 342 with a plate like top portion. The activator 342 may be included in a lid of a nest, particularly in situations where plural vials 2 and closure systems 3 are to be processed together.

Figure 2:
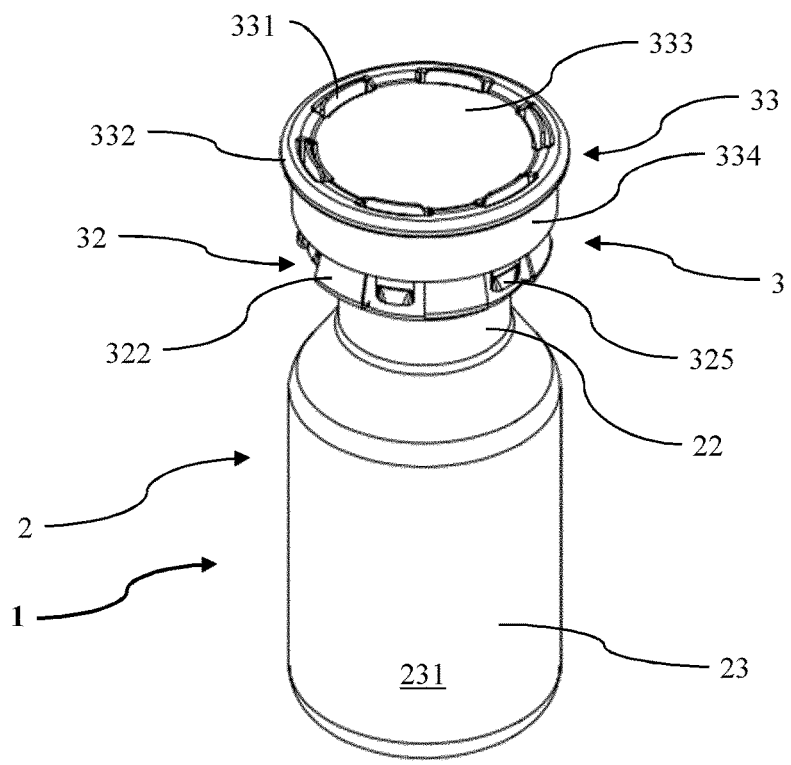
FIG. 2 shows a perspective view from above to the kit of FIG. 1, wherein an activator of a lock activation formation is removed.

In FIG. 2, the kit 1 is shown as in FIG. 1 but the activator 342 of the lock activation formation 34 is removed. The cover 33 has a ring portion 334 dimensioned to partially surround the cage 32 when being mounted to the vial 2, and a circular disk portion 333 dimensioned to close a top side of the cage 32. The disk portion 333 radially projects over the ring portion 334 such that a flange portion 332 is established. Adjacent to the flange portion 332 six slit-like through holes 331 are regularly arranged around the cover 33.

The cage 32 has a plurality of positive form lock elements as a locking structure each having a downwardly extending tongue 322 as tongue portion. Further, the cage 32 has a detent structure with a plurality of downwardly extending clamping elements 325 configured to clamp the head 21 of the vial 2 in the assembled state of the closure system 3.

Figure 3:
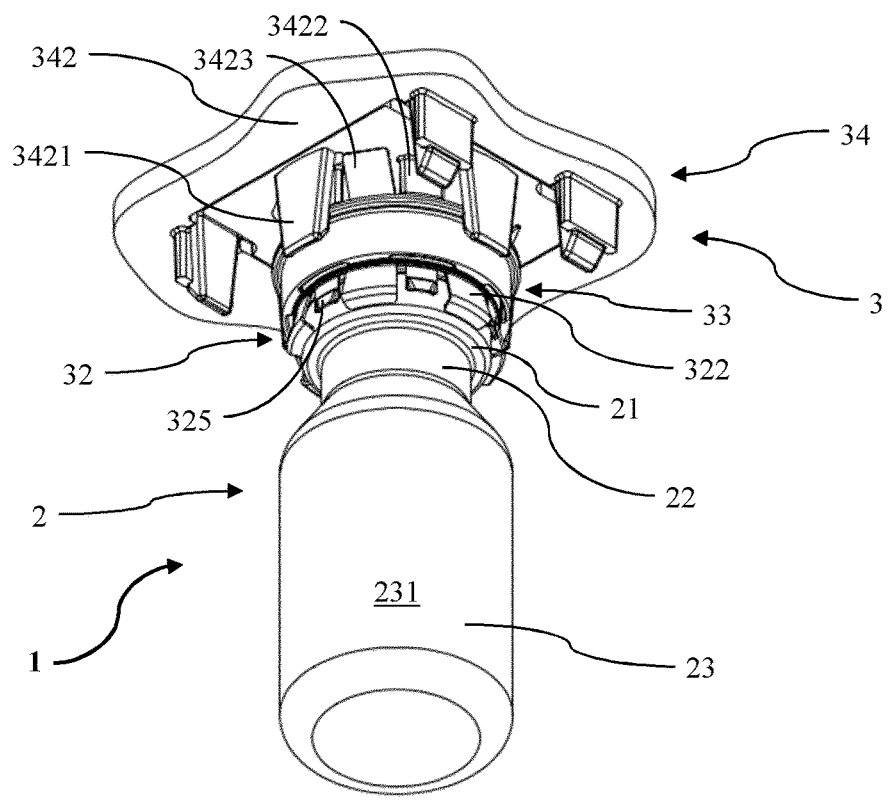
FIG. 3 shows a perspective view of the kit of FIG. 1 from below.

FIG. 3 shows the kit 1 perspectively from below. Thereby, it can be seen that the activator 342 of the lock activation formation 34 is equipped with four downwardly extending clipping arms 3421 as clip structure and six downwardly extending blades 3422 adjacent to and corresponding to the six through holes 331 of the cover 33. In the assembled state, the clipping arms 3421 are clipped or snap-fitted behind the flange portion 332 of the cover 33 such that the activator 342 is secured to the cover 33. By having the blades 3422, the activator 342 is shaped to access a surrounding member 341 of the lock activation formation through cover 33 as described in more detail below. Further the activator 342 is equipped with four downwardly extending inclined or diagonal lamellas 3423 as spring or support members. The lamellas 3423 are positioned between the activator 342 and the cover 33 such that the activator 342 is pushed away from the cover 33 and the cage 32.

Figure 4:
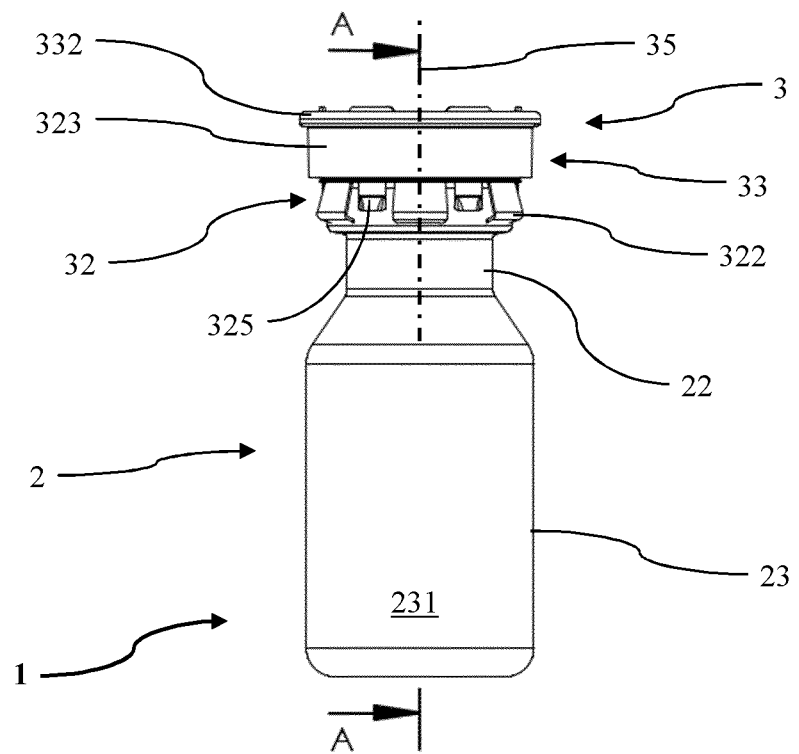
FIG. 4 shows a side view of the kit of FIG. 1, wherein the activator is removed.

As can be best seen in the side view of FIG. 4, the closure system 3 defines a central axis 35 which is in one line with a central axis of rotation of the vial 2 when the closure system 3 is in the assembled state.

Figure 5:
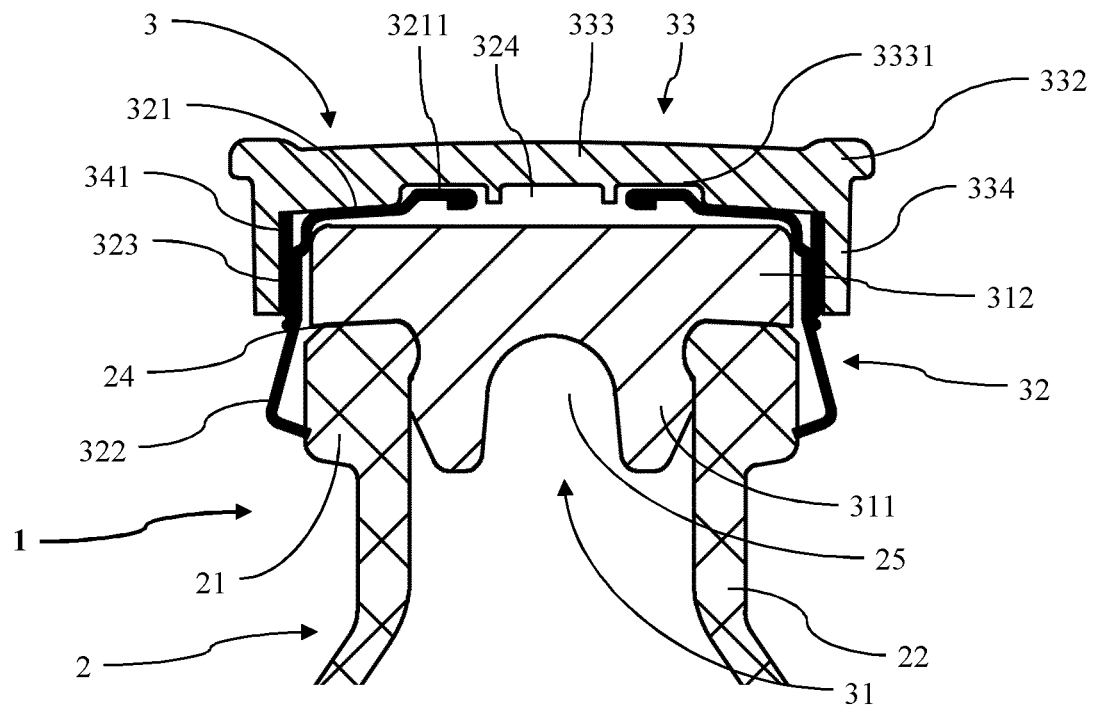
FIG. 5 shows a portion of a cross section of the kit of FIG. 1 cut along the line A-A of FIG. 4.

In FIG. 5, a section of the kit 1 near the head 21 of the vial 2 and the closure system 3 mounted thereto is shown in a cross-sectional view. The cage 32 of the closure system 3 is made of a rigid but to a certain extent elastic metallic material such as stainless steel. It has a more or less disk-shaped stopper contacting section 321 with a central aperture 324. Further, from the stopper contacting section 321, an essentially cylindrical intermediate section 323 downwardly extends which in turn passes over into the downwardly extending tongues 322 and the downwardly extending clamping elements 325. The tongues 322 and the clamping elements 325 are regularly and alternately distributed about the intermediate section 323.

As can be seen in FIG. 5, the closure system 3 further comprises a stopper 31 having a plug portion 311 and an essentially disk-shaped cover portion 312. In the assembled state, the plug portion 311 is tightly fitted into an opening 25 of the vial 2 provided through the head 21 of the vial 2. More specifically, the plug portion 311 is dimensioned such that it is compressed when being pushed into the opening 25 thereby tightening the opening of the vial 2. At the same time, the cover portion 312 abuts a boundary surface 24 adjacent to the opening 25 of the vial 2. The plug portion 311 has a dome-shaped cavity downwardly opening.

The surrounding member 341 of the lock activation formation 341 is positioned around the intermediate section 323 of the cage 32. More specifically, the surrounding member 341 is dimensioned to fit to the cage 32 such that it is held by friction on the cage 32. The cage 32 is in a detached position in which it is not fixed but releasably held to the vial 2. In this detached position, the tongues 322 downwardly protrude the surrounding member 341 and the cover portion 312 of the stopper 31 is substantially non-compressed. The tongues 322 do not engage or do disengage the vial 2.

In the cross-sectional view of FIG. 5, the tongues 322 of the locking structure of the cage 32 are essentially L-shaped having a straight leg section and a straight foot section. The leg section downwardly extends from the intermediate section 323 of the cage 32. Thereby, the leg sections of the tongues are not parallel to the axis 35 but aligned at an acute angle relative to the axis 35. Each leg section of the tongues 322 passes over into the foot section at it bottom end, wherein the foot sections and the leg sections are at a more or less right angle relative to each other.

The ring portion 334 of the cover 33 is arranged around the surrounding member 341 of the lock activation formation 34 wherein it is dimensioned to be held by friction. At a lower face of the disk portion 333 a circular indentation or recess 3331 is embodied which receives a corresponding circular bulge 3211 of the stopper contacting section 321 of the cage 32 surrounding the circular aperture 324.

Figure 6:
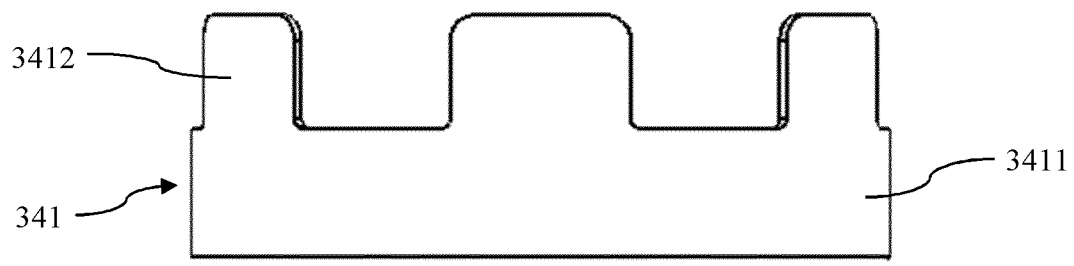
FIG. 6 shows a side view of a surrounding member of the kit of FIG. 1.

FIG. 6 shows the surrounding member 341 of the lock activation formation which is essentially crown-shaped. In particular, the surrounding member 341 consists of a ring 3411 from which six blades 3412 upwardly extend. The blades 3412 correspond to the through holes 331 of the cover 33. The surrounding member 341 is made as one piece of stainless steel.

Figure 7:
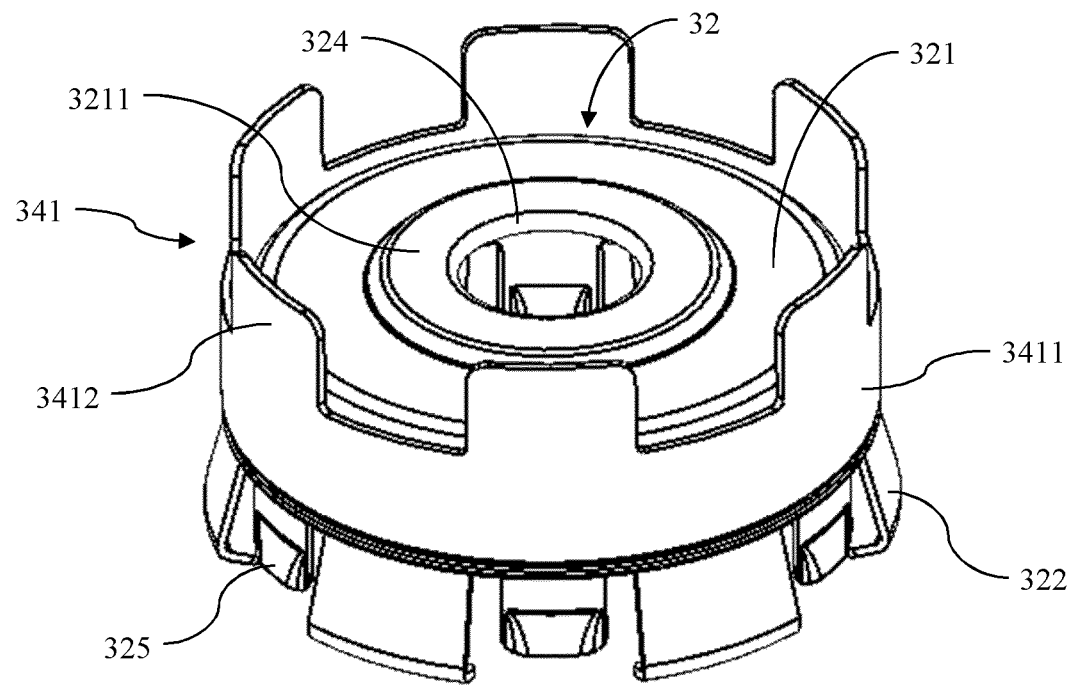
FIG. 7 shows a perspective view of the surrounding member of FIG. 6 arranged around the cage member.

In FIG. 7 the surrounding member 341 is shown set onto the cage 32. Thereby, it can be seen that the blades 3412 of the surrounding member 341 are aligned with the clamping elements 325 of the cage 32. Accordingly, the tongues 322 are arranged at the sections of the ring 3411 not being provided with the tongues.

Figure 8:
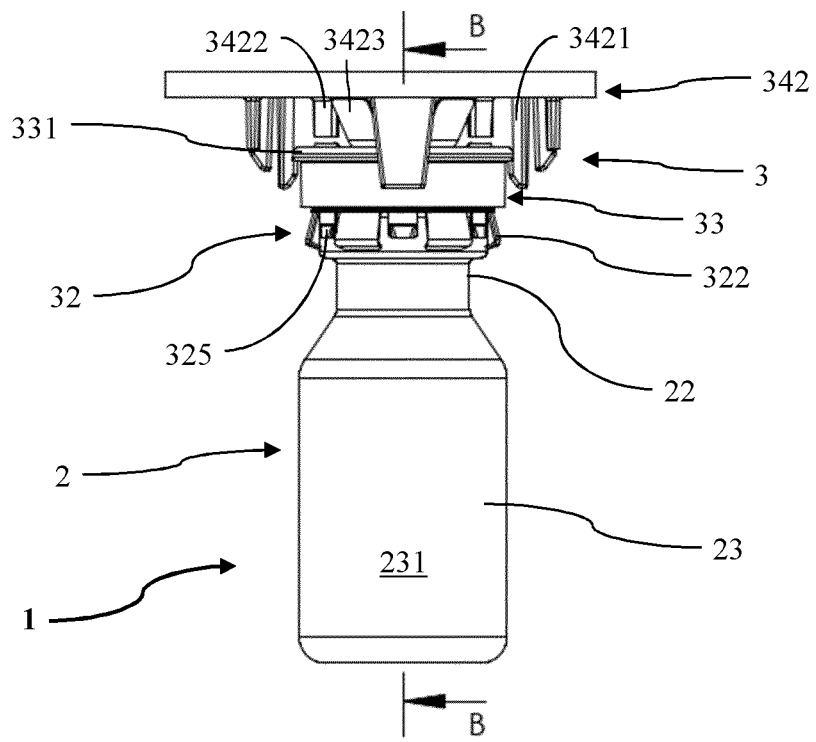
FIG. 8 shows a side view of the kit of FIG. 1.

FIG. 8 shows that the activator 342 is held by the lamellas 3423 and the clipping arms 3421. In particular, the activator 342 is pushed away from the cover 33 by the lamellas 3423 and, at the same time prevented from being separated from the cover 33 by the clipping arms 3421. In this status, the lock activation formation 34 is in a non-activating position.

Figure 9:
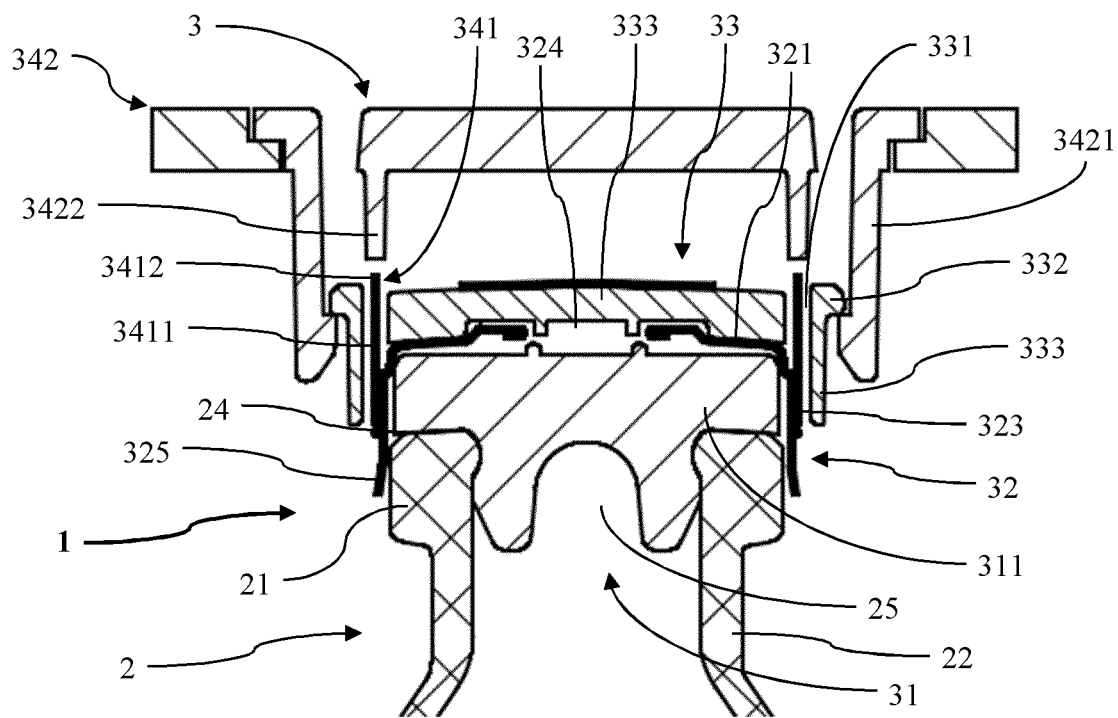
FIG. 9 shows a portion of a cross section of the kit of FIG. 1 cut along the line B-B of FIG. 8.

As indicated in FIG. 8, the cross section shown in FIG. 9 is cut along the axis 35 through the kit 1 at two opposite clamping elements 325 and, thus two opposite blades 3412 of the surrounding member 341. Thereby, it can be seen that the blades 3412 extend bottom up through the through holes 331 of the cover 33. The blades 3422 of the activator 342 are positioned adjacent to and on top of the blades 3412 of the surrounding member 341.

The clamping elements 325 of the cage 32 are arranged at a circumference of the head 21 of the vial 2 such that the head 21 is clamped in between the clamping elements 325. Like this, the cage 32 is held on the vial 2.

Figure 10:
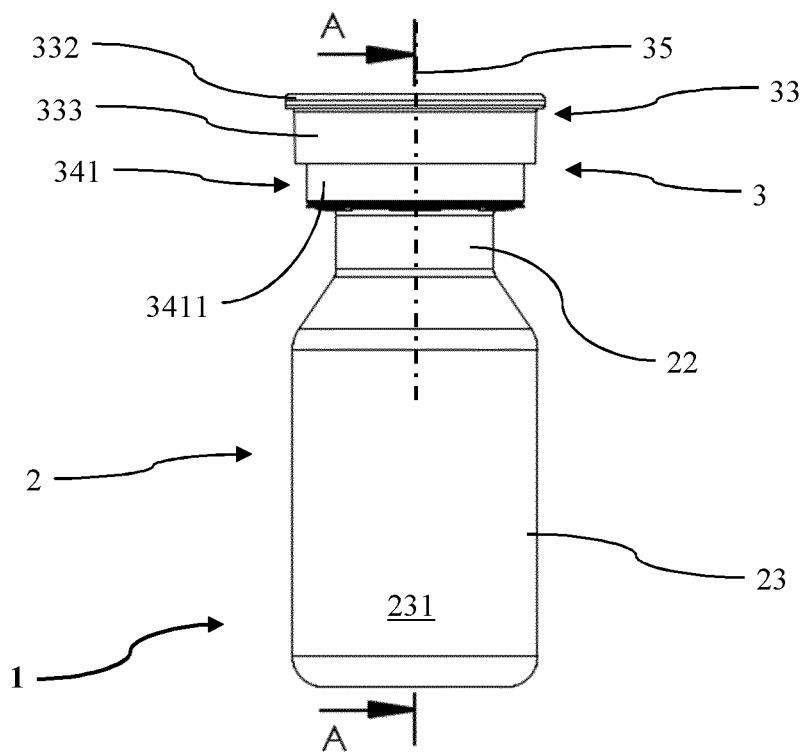
FIG. 10 shows a side view of the kit of FIG. 1, wherein the closure system is in the assembled state, its cage member is in a fixed position and the activator is removed.
Figure 11:
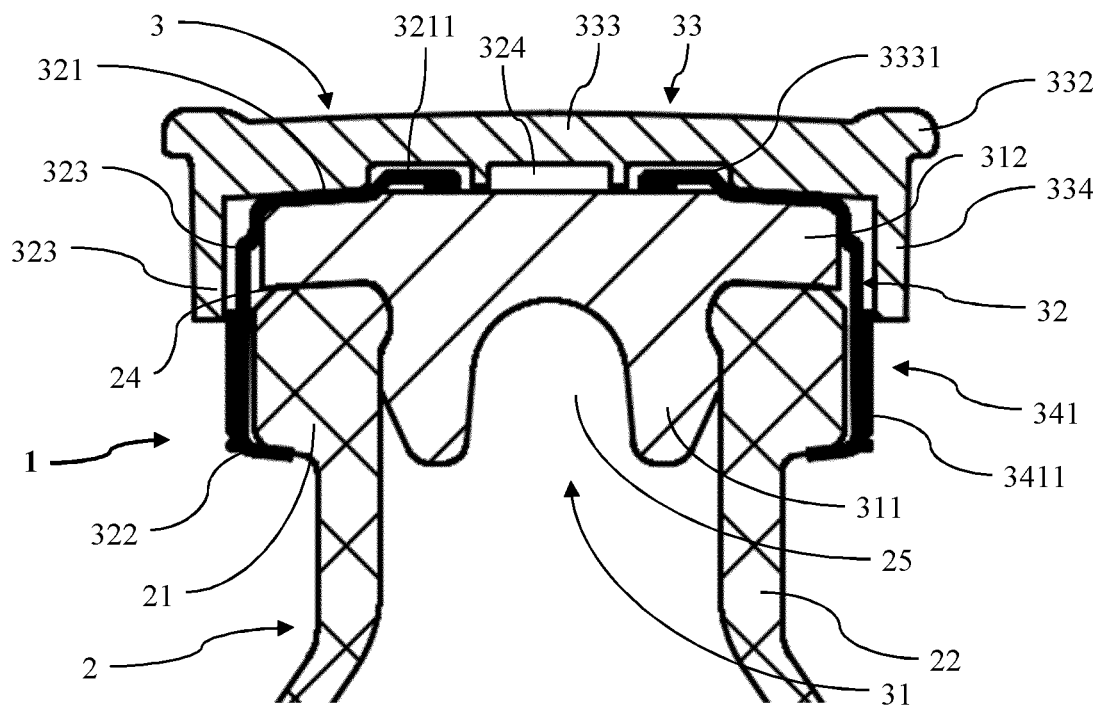
FIG. 11 shows a portion of a cross section of the kit of FIG. 10 cut along the line A-A of FIG. 10.

In FIG. 10 the kit 1 is shown with the closure system 3 in the assembled state, wherein the cage 32 is in a fixed position. As can be best seen in FIG. 11, the cover 33 is pressed on the cage 32 which in turn compresses the cover portion 312 of the stopper 31 between its stopper contacting section 321 and the boundary surface 24 of the vial 2. Like this, an appropriate tightness between the vial 2 and the stopper 31 can be established and assured.

The tongues 322 are downwardly moved relative to the vial 2 and the surrounding member 341 of the lock activation formation 34 is downwardly moved relative to the cage 32. Thereby, the surrounding member 341 interacts with the tongues 322, i.e. contacts the tongues 322 and inwardly bends them towards the axis 35. More specifically, the tongues 322 are deformed such that their leg sections are essentially parallel to the axis 35 and their foot sections grip or engage the lower end of the head 21 of the vial 2 as corresponding structure of the vial 2. Thereby, a form-fitted connection between the cage 32 and the vial 2 is generated such that the cage 32 is locked on the vial 2 and the stopper 31 is secured in the compressed state. Like this, a sufficiently tight closing of the vial 2 can be achieved.

Figure 12:
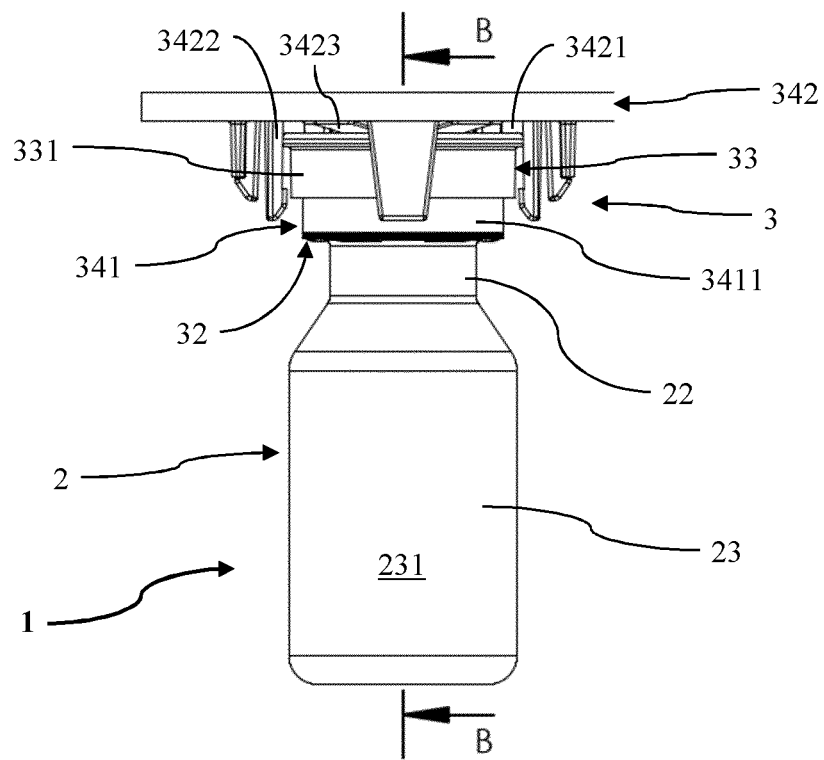
FIG. 12 shows a side view of the complete kit of FIG. 10.
Figure 13:
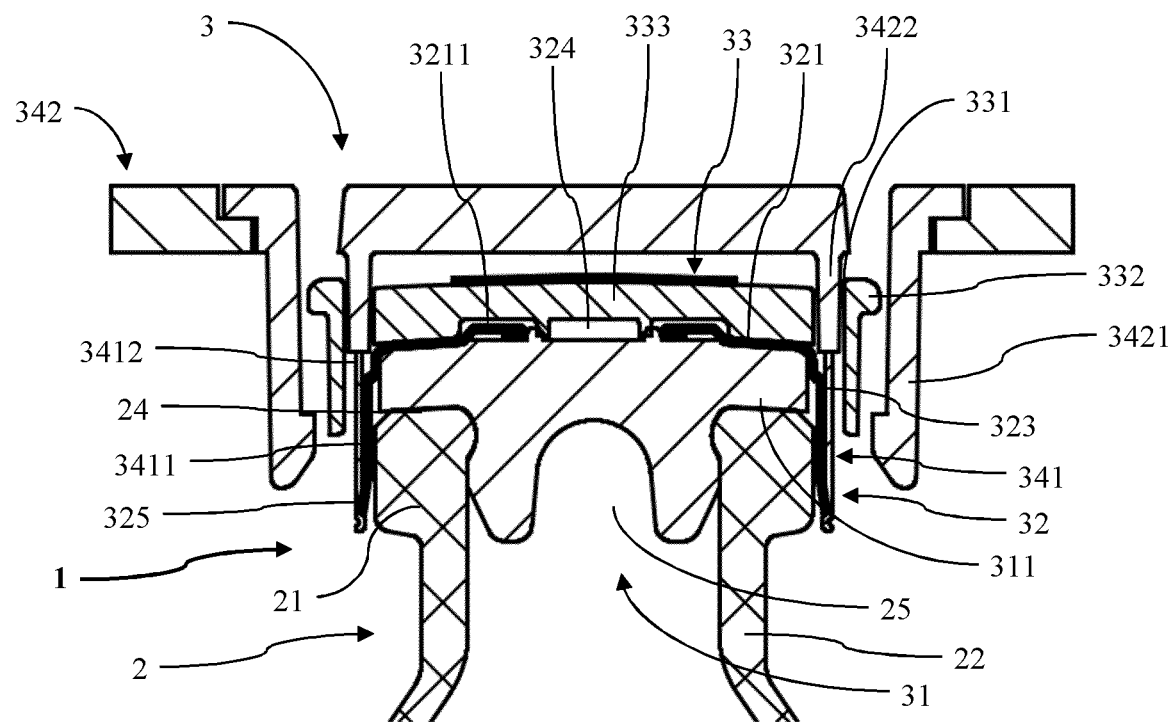
FIG. 13 shows a portion of a cross section of the kit of FIG. 10 cut along the line B-B of FIG. 12.

As can be seen in FIG. 12 and FIG. 13 for locking the closure system 3 to the vial 2 the activator 342 of the lock activation formation 34 is downwardly pushed from the non-activating position into an activating position. Thereby, the stopper contacting section 321 of the cage 32 is pressed onto the cover portion 312 of the stopper 31. As soon as a respective pushing force reaches a predefined force, such as 15 N, which is adjusted to achieve an appropriate compression of the cover portion 312 of the stopper 31, the lamellas 3423 inwardly collapse. The activator 342 now is downwardly moved relative to the cage 32 and vial 2. Thereby, the blades 3421 of the activator 342 are moved top down into the through holes 331 of the cover 33. The blades 3412 of the surrounding member 341 are contacted such that the surrounding member 341 is downwardly moved relative to the cage 33 which in turn inwardly moves the tongues 322 to lock the cage 32 on the vial 2 as described above. Like this, the lock activation formation 34 interacts with the cage 32 to change the cage 32 from the detached position to the fixed position.

This description and the accompanying drawings that illustrate aspects and embodiments of the present invention should not be taken as limiting—the claims defining the protected invention. In other words, while the invention has been illustrated and described in detail in the drawings and foregoing description, such illustration and description are to be considered illustrative or exemplary and not restrictive.

Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the Figs. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

The invention claimed is:

1. A closure system for closing an opening of a container, comprising:
    a stopper member made of an elastic material and having a plug portion configured to fit into the opening of the container and a cover portion configured to abut a boundary surface adjacent to the opening of the container;
    a cage member made of a shape-retentive material;
    a cover member reversibly mountable to the cage member; and
    a lock activation formation,
    wherein the closure system is configured to be in an assembled state in which the plug portion of the stopper member is fitted into the opening of the container, the cover portion of the stopper member abuts the boundary surface of the container and the cage member is mounted to the container,
    wherein the cage member has a locking structure,
    wherein the locking structure of the cage member is configured, in the assembled state of the closure system, to be in a detached position in which the locking structure of the cage member is disengaged from the container, and in a fixed position in which the locking structure engages a corresponding structure of the container, wherein the lock activation formation is configured to interact with the cage member such that the cage member changes from the detached position to the fixed position,
wherein the lock activation formation has a surrounding member configured to, in the assembled state of the closure system, at least partially surround the locking structure of the cage member, and
wherein the lock activation formation comprises an activator configured to, in the assembled state of the closure system, move the surrounding member of the lock activation formation from a non-activating position to an activating position, and wherein the cover member has at least one through hole and the activator of the lock activation formation is shaped to access the surrounding member of the lock activation formation through the at least one through hole of the cover member.

2. The closure system of claim 1, wherein the locking structure of the cage member is deformable from the detached position to the fixed position.

3. The closure system of claim 1, wherein the cage member is made of a deformable material.

4. The closure system of claim 1, wherein the locking structure of the cage member comprises at least one form fit lock element configured to be deformed to engage the corresponding structure of the container when the locking structure is in the fixed position.

5. The closure system of claim 1, wherein the cage member has a stopper contacting section and an intermediate section between the stopper contacting section and the locking structure, and wherein the cage member is configured to apply a force to the cover portion of the stopper member to push the cover portion of the stopper member onto the boundary surface of the opening of the container when the closure system is in the assembled state and the cage member is in the fixed position.

6. The closure system of claim 4, wherein the cage member has a stopper contacting section and an intermediate section between the stopper contacting section and the locking structure, wherein the cage member is configured to apply a force to the cover portion of the stopper member to push the cover portion of the stopper member onto the boundary surface of the opening of the container when the closure system is in the assembled state and the cage member is in the fixed position, and wherein the at least one form fit lock element of the locking structure of the cage member has a tongue portion extending from the intermediate section of the cage member.

7. The closure system of claim 1, wherein the surrounding member of the lock activation formation is configured to, in the assembled state of the closure system, contact the locking structure of the cage member such that the locking structure is deformed into the fixed position of the cage member.

8. The closure system of claim 1, wherein the lock activation formation is configured to, in the assembled state of the closure system, move relative to the cage member from a non-activating position into an activating position.

9. The closure system of claim 7, wherein the lock activation formation is configured to, in the assembled state of the closure system, move relative to the cage member from a non-activating position into an activating position, and wherein the surrounding member of the lock activation formation is configured to, in the assembled state of the closure system, move from the non-activating position, in which the locking structure is essentially non-deformed, to the activating position, in which the surrounding member of the lock activation formation contacts the locking structure of the cage member such that the locking structure is deformed into the fixed position of the cage member.

10. The closure system of claim 9, wherein the lock activation formation comprises an activator configured to, in the assembled state of the closure system, move the surrounding member of the lock activation formation from the non-activating position to the activating position.

11. The closure system of claim 1, comprising a support member arranged to resist a movement of the lock activation formation towards the cage member.

12. The closure system of claim 11, wherein the support member is configured not to resist the movement of the lock activation formation towards the cage member if the lock activation formation is forced towards the cage member with a predefined force.

13. The closure system of claim 1, wherein the cage member has a detent structure configured to hold the cage member on the container when being in the detached position in the assembled state of the closure system.

14. The closure system of claim 13, wherein the detent structure of the cage member has at least one clamping element configured to clamp the container in the assembled state of the closure system.

15. The closure system of claim 1, wherein the lock activation formation has a clip structure configured to be clipped to the cover member.

16. A kit comprising:
a container; and
a closure system,
wherein the container comprises an opening for accessing an interior of the container and a boundary surface adjacent to the opening,
wherein closure system comprises a stopper member, a cage member, a cover member reversibly mountable to the cage member, and a lock activation formation,
wherein the stopper member is made of an elastic material and has a plug portion configured to fit into the opening of the container and a cover portion configured to abut the boundary surface adjacent to the opening of the container,
wherein the cage member is made of a shape-retentive material, and
wherein the closure system is configured to be in an assembled state in which the plug portion of the stopper member is fitted into the opening of the container, the cover portion of the stopper member abuts the boundary surface of the container and the cage member is mounted to the container,
wherein the cage member has a locking structure,
wherein the locking structure of the cage member is configured, in the assembled state of the closure system, to be in a detached position in which the locking structure of the cage member is disengaged from the container, and in a fixed position in which the locking structure engages a corresponding structure of the container,
wherein the lock activation formation is configured to interact with the cage member such that the cage member changes from the detached position to the fixed position,
wherein the lock activation formation has a surrounding member configured to, in the assembled state of the closure system, at least partially surround the locking structure of the cage member, and wherein the lock activation formation comprises an activator configured to, in the assembled state of the closure system, move the surrounding member of the lock activation formation from a non-activating position to an activating position, and wherein the cover member has at least one through hole and the activator of the lock activation formation is shaped to access the surrounding member of the lock activation formation through the at least one through hole of the cover member.

17. The kit of claim 16, wherein the closure system is embodied according to claim 2.

18. The closure system of claim 3, wherein the deformable material is a metal.

19. The closure system of claim 18, wherein the metal is stainless steel.

\* \* \* \* \*